(12) United States Patent
Tremaudant et al.

(10) Patent No.: US 7,719,151 B2
(45) Date of Patent: May 18, 2010

(54) ACTIVE MAGNETIC BEARING WITH AUTOMATIC DETECTION OF THE POSITION THEREOF

(75) Inventors: Yann Tremaudant, Poissy (FR); Maurice Brunet, Sainte Colombe Pres Vernon (FR); Ulrich Schroeder, Mont Saint Aignan (FR)

(73) Assignee: Societe de Mecanique Magnetique, Saint Marcel (FR)

( * ) Notice: Subject to any disclaimer, the term of this patent is extended or adjusted under 35 U.S.C. 154(b) by 603 days.

(21) Appl. No.: 10/593,611

(22) PCT Filed: Mar. 16, 2005

(86) PCT No.: PCT/FR2005/000626
§ 371 (c)(1),
(2), (4) Date: Sep. 21, 2006

(87) PCT Pub. No.: WO2005/103517
PCT Pub. Date: Nov. 3, 2005

(65) Prior Publication Data
US 2007/0195479 A1 Aug. 23, 2007

(30) Foreign Application Priority Data
Mar. 22, 2004 (FR) .................................. 04 02902

(51) Int. Cl.
*H02K 7/09* (2006.01)

(52) U.S. Cl. ........................... 310/90.5; 310/216.016; 310/216.017; 310/216.018

(58) Field of Classification Search ............... 310/90.5, 310/216.016, 216.017, 216.018
See application file for complete search history.

(56) References Cited

U.S. PATENT DOCUMENTS
3,557,629 A 1/1971 Quermann
(Continued)

FOREIGN PATENT DOCUMENTS
EP 1 312 822 5/2003

OTHER PUBLICATIONS
SKF Industries, Hybrid bearings for electrical machinery,2001, publication 5128 E, p. 1.*

*Primary Examiner*—Quyen Leung
*Assistant Examiner*—Terrance Kenerly
(74) *Attorney, Agent, or Firm*—Weingarten, Schurgin, Gagnebin & Lebovici LLP

(57) ABSTRACT

An active magnetic bearing (100) with autodetection of position, the bearing comprising at least first and second opposing electromagnets (120, 130) forming stators disposed on either side of a ferromagnetic body (110) forming a rotor and held without contact between said electromagnets. The first and second electromagnets (120, 130) each comprising a magnetic circuit (121; 131) essentially constituted by a first ferromagnetic material and co-operating with said ferromagnetic body to define an airgap, together with an excitation coil (122; 132) powered from a power amplifier whose input current is servo-controlled as a function of the position of the ferromagnetic body relative to the magnetic circuits of the first and second electromagnets. The position of the ferromagnetic body (110) being measured from the inductance detected between the two electromagnets (120, 130) in response to simultaneous injection into both opposing electromagnets of a sinusoidal current at a frequency that is greater than the closed loop passband of the system. The magnetic circuit (121; 131) of each electromagnet further includes a portion (124; 134) in the vicinity of the excitation coil (122; 132) that uses a second ferromagnetic material having magnetic permeability that is lower than that of the first material and electrical resistivity that is higher than that of the first material so as to encourage the passage of the high frequency magnetic fields that are generated in the bearing.

16 Claims, 2 Drawing Sheets

U.S. PATENT DOCUMENTS 5,216,308 A * 6/1993 Meeks .................. 310/90.5
5,250,865 A    10/1993 Meeks
5,289,066 A *  2/1994 Clark ................... 310/67 R
5,844,339 A * 12/1998 Schroeder et al. ......... 310/90.5
6,770,995 B1 * 8/2004 Foshage ................. 310/90.5
2008/0100162 A1 * 5/2008 Garvey ................. 310/90.5

* cited by examiner

ACTIVE MAGNETIC BEARING WITH AUTOMATIC DETECTION OF THE POSITION THEREOF

This application is a 371 national phase filing of PCT/FR2005/000626 filed Mar. 16, 2005, and claims priority to French application No. 04 02902 filed Mar. 22, 2004.

FIELD OF THE INVENTION

The present invention relates to active magnetic bearings in which, in addition to their bearing function proper, a detection function of the inductive type is also performed, with this being done without adding any electromagnetic circuit or any amplifier other than those used for performing the bearing function.

PRIOR ART

Integrating the function of detecting the position of the suspended body in an active magnetic bearing, known as a bearing with autodetection, presents numerous advantages in terms of cost, rationalization, and precision of detection in comparison with more conventional systems in which the position of the suspended body, such as a rotor or a disk, is measured using position detectors that are distinct from the elements of the driving bearing for producing the forces needed to hold the body in a determined working position.

U.S. Pat. No. 5,844,339 (or FR 2,716,700) describes a magnetic bearing device with autodetection of position in which the operating principle is as shown in FIG. 3. In FIG. 3, a rotor 1 is held suspended by two opposing bearing electromagnets. Each electromagnet comprises a respective magnetic circuit 12, 22 of ferromagnetic material facing the rotor 1, which is itself made of ferromagnetic material. Each electromagnet also has a example excitation coil 11, 21 which is powered by a respective power amplifier 13, 23 receiving as input a main input current (bearing current) making it possible to deliver to the coils 11, 21 the energy required for maintaining the rotor 1 in its predetermined equilibrium position. The bearing current comes from respective servo-control circuits 31, 32, themselves receiving information about the real position of the rotor and taking account of a reference position.

In order to obtain position information without using a position detector that is distinct from the electromagnets of the bearing, respective adders 14, 24 are used to inject sinusoidal currents that are superposed on the bearing currents. As described in detail in U.S. Pat. No. 5,844,339, the radial position of the rotor 1 along the axis XX' can be detected from the voltages $U_1$ and $U_2$ measured across the terminals of the excitation coils 11 and 12 respectively. The voltages $U_1$ and $U_2$ vary as a function of the inductances $L_1$ and $L_2$ of the electromagnets, which in turn vary depending on the position of the rotor between the electromagnets of the bearing. A signal representative of the position of the rotor can then be obtained by causing voltage U corresponding to the difference between the voltages $U_1$ and $U_2$ as measured at the outputs from the coils to be subjected to filtering 42 and to demodulation 43 (at the frequency corresponding to the frequency of the injected detection current signal). This signal is then compared with a reference position signal input to the servo-control circuits.

That circuit is used mainly with radial magnetic bearings that support rotary shafts of rotary machines such as turbopumps. Thus, the radial position of the shaft can be measured by measuring the variation in the inductance of the bearing, which variation is a function of the radial displacement of the shaft.

Although the device described in U.S. Pat. No. 5,844,339 operates in satisfactory manner, it nevertheless presents certain limitations that prevent its field of action from being enlarged. In that device, the carrier frequency of the current signal injected into the bearing for detecting position is voluntarily selected to be well above the closed loop passband of the servo-control circuits so as to avoid disturbing the primary function of the bearings, namely keeping the rotor in position. The carrier frequency is typically about 20 kilohertz (kHz) so as to make a passband of sufficient width (at least 1000 Hz) available, after demodulation of filtering. In addition, in order to retain a satisfactory signal-to-noise ratio, the ratio $\hat{i}_{carrier}/I_{max}$ must be greater than 0.01 (where $\hat{i}_{carrier}$=the amplitude of the current injected with the carrier and $I_{max}$=the maximum current the amplifier can deliver), with the amplitude $i_0$ of the injected current being about 20 milliamps (mA).

It is recalled that the advantage of an autodetection bearing is to simplify significantly both the mechanical portion of the magnetic bearing and the connections it requires, thereby reducing manufacturing costs, which is particularly advantageous for mass-produced equipments. Consequently, autodetection bearing technology is justified only when it does not lead to excessive extra costs in terms of the associated electronics. The cost of the associated electronics depends on its complexity and also and above all on the performance required of the bearing power amplifiers. For the above-described autodetection bearing, the amplifiers need to be dimensioned as a function of the voltage that the bearing needs to deliver in order to hold the rotor in position and not as a function of the signals used for detecting position. Unfortunately, the detection voltage $\hat{U}_d$ as measured at the output from the bearing is calculated using the following equation (1):

$$\hat{U}_d = L_{bearing} \omega \hat{i} \quad (1)$$

where:
  $\omega$=the angular frequency of the carrier (typically 20 kHz);
  $L_{bearing}$=the total inductance of the bearing as seen at the carrier frequency; and
  $\hat{i}$=the amplitude of the carrier current.

The inductance $L_{bearing}$ is proportional to the size (dimensions) of the bearing itself. The inductance seen at the frequency of the carrier is the sum of the leakage inductance (no variation with the variations in airgap) plus an inductance that does vary with the airgap. For a radial autodetection bearing, made using thin laminations, the inductance seen at the frequency of the carrier has approximately the same value as the inductance seen at the frequency of the bearing. The leakage inductance is small. Inductance increases with the size of the bearing itself.

In practice, in order to conserve a signal-to-noise ratio that is satisfactory, it is ensured that the amplitude of the carrier current ($\hat{i}_{carrier}$) corresponds to at least 1% of the maximum current of the amplifier (e.g. $\hat{i}_{carrier}$>20 mA for an amplifier that can deliver up to a maximum of 2 amps (A)). Equation (1) shows that starting from certain dimensions for the bearing, the inductance $L_{bearing}$ reaches values such that, in order to satisfy $\hat{i}_{bearing}/I_{max}$>0.01, it is necessary to use a detection voltage that becomes greater than the voltage needed to keep the rotor in position.

With axial bearings that generally make use of a solid abutment flywheel and a stator that is not laminated or that is laminated very little, the inductance seen at the frequency of the carrier is essentially leakage inductance. There is practically no inductance that varies with the airgap. Under such circumstances, the principle of an autodetection bearing is difficult to achieve.

Furthermore, in a conventional autodetection bearing, there is coupling between the inductance at 20 kHz and the bearing current, i.e. the inductance of the electromagnet decreases with increasing magnetic field generated in the bearing. In practice, this coupling falsifies the position information and increases sensitivity as a function of frequency (generating noise in the servo-control). Nevertheless, it is possible to compensate for this coupling effect in the electronics, but the maximum magnetic induction that is generated must then remain below about 1 tesla (T).

OBJECT AND BRIEF SUMMARY OF THE INVENTION

The present invention seeks to remedy the above-mentioned drawbacks of radial and axial magnetic bearings and to provide an active magnetic bearing structure with autodetection that guarantees a sufficient level of inductance (coupled with the airgap), and that does so independently of surrounding sources of disturbance such as the dimensions and the current of the bearing.

This object is achieved with an active magnetic bearing with autodetection of position, the bearing comprising at least first and second opposing electromagnets forming stators disposed on either side of a ferromagnetic body forming a rotor and held without contact between said electromagnets, the first and second electromagnets each comprising a magnetic circuit essentially constituted by a first ferromagnetic material and co-operating with said ferromagnetic body to define an airgap, together with an excitation coil powered from a power amplifier whose input current is servo-controlled as a function of the position of the ferromagnetic body relative to the magnetic circuits of the first and second electromagnets, the position of the ferromagnetic body being measured from the inductance detected between the two electromagnets in response to simultaneous injection into both opposing electromagnets of a sinusoidal current at a frequency that is greater than the closed loop passband of the system, and in which, in accordance with the invention, the magnetic circuit of each electromagnet further includes a portion in the vicinity of the excitation coil that uses a second ferromagnetic material having magnetic permeability that is lower than that of the first material and electrical resistivity that is higher than that of the first material so as to encourage the passage of the high frequency magnetic fields that are generated in the bearing.

Thus, the magnetic bearing of the invention includes a portion of permeability and resistivity that are adapted to "channel" the high frequency magnetic field lines used for autodetection of position in the bearing. Such a bearing structure makes it possible to guarantee inductance values at high frequency that are well defined independently of the dimensions of the bearing and of the current fed thereto.

In an embodiment of the bearing, the portion with low permeability and high resistivity is formed in a part made of powder comprising grains of magnetic material, such as grains of iron, that are electrically insulated from one another.

The ferromagnetic body forming the rotor can thus also include at least one portion of permeability that is lower and resistivity that is higher than in the remainder of the body so as to encourage the passage of high frequency magnetic fields, said portion being disposed substantially in register with the portion of low permeability and high resistivity formed in the electromagnet. Depending on circumstances, this portion may be formed using a part made of powder comprising grains of magnetic material, such as grains of iron, that are electrically insulated from one another, or by ferromagnetic laminations of small thickness.

The portion(s) of low permeability and high resistivity that are formed in the bearing preferably present relative magnetic permeability of about 100 and electrical resistivity of about 50 ohm meters ($\Omega$m).

The above-described active magnetic bearing is equally applicable to bearings of the axial type and to bearings of the radial type.

BRIEF DESCRIPTION OF THE DRAWINGS

Other characteristics and advantages of the invention appear from the following description of particular embodiments of the invention, given as non-limiting examples and with reference to the accompanying drawings, in which.

DETAILED DESCRIPTION OF PARTICULAR EMBODIMENTS

Figure 1:
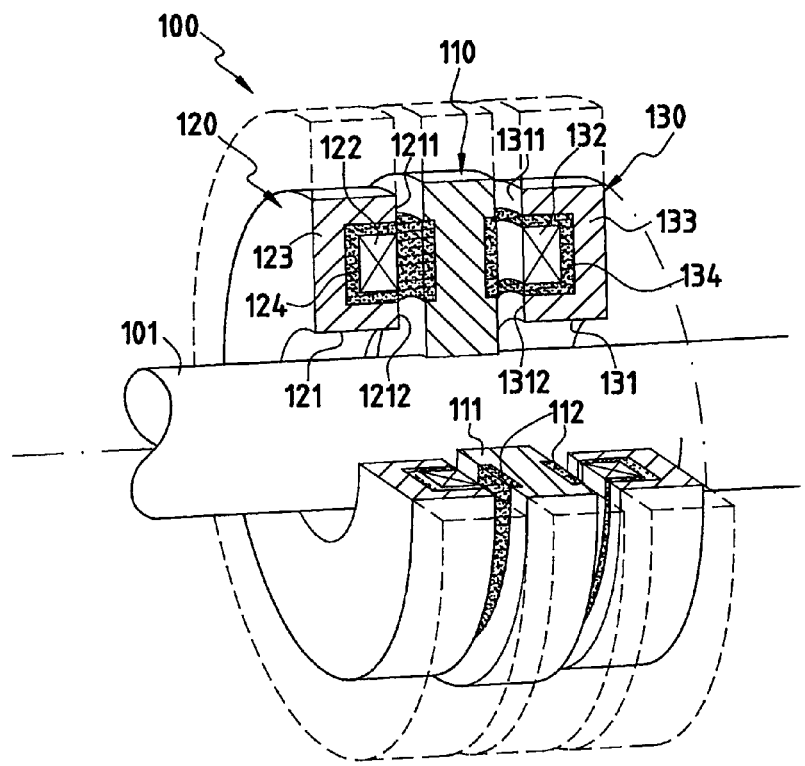
FIG. 1 is an axial half-section view of an axial magnetic bearing structure with autodetection of position in accordance with an embodiment of the present invention.

FIG. 1 shows a first example of a bearing structure with autodetection of position in the present invention as applied to an axial bearing such as an abutment device used in rotary machines for controlling the axial position of the rotary shaft. The axial bearing 100 has two electromagnets 120 and 130 forming a stator and each comprising a respective magnetic circuit 121, 131, together with a respective coil 122, 132 driven in current by a servo-control system of well-known type so as to maintain the position of a rotor 110 that is in the form of a disk secured to a shaft 101.

In addition to its bearing function proper, the axial bearing 100 is used as an inductive type position detector without it being necessary to add any additional coil. This detection function is implemented in known manner as described above, i.e. by measuring the voltage across the terminals of each of the coils of the bearing electromagnet under conditions that ensure substantial proportionality with the displacement of the interposed body (rotor).

In accordance with the present invention, each magnetic circuit 121, 131, which normally presents a solid structure constituted by a single ferromagnetic material such as iron, now comprises two portions 123 & 124, 133 & 134 that are made of ferromagnetic materials having differing magnetic and electrical properties. More precisely, each magnetic circuit 121, 131 comprises a respective first portion 123, 133 that is solid, in this case having a U-shaped section with two pole pieces respectively 1211 & 1212, 1311 & 1312. This first portion is made using a ferromagnetic material having high magnetic permeability (typically >1000) such as iron, so as to provide the path for the low-frequency magnetic fields generated to perform the bearing function proper. In other words, the first portions 123, 133 serve to retain the conventional technology of a high-permeability solid stator for the purpose of passing low-frequency magnetic fields (generally at a frequency lower than 200 Hz) while the bearing is under current control.

The second portions 124, 134 are made using a ferromagnetic material that presents magnetic permeability that is much lower than that of the material used for the first portions, namely a material having a coefficient of permeability of the order of 100, and preferably less than that. In addition, the material constituting the second portions also needs to present high electrical resistivity (e.g. 50 Ωm) in order to encourage the passage of high frequencies, such as frequencies of about 20 kHz, for example, corresponding to the angular frequency of the sinusoidal signal injected into the coils in order to detect position. For this purpose, the material of the second portion may be a powder comprising grains of magnetic material, such as grains of iron, that are electrically insulated from one another and that present permeability that is small compared with that of solid materials while having high resistivity because the grains are electrically insulated from one another. It is also possible to use any type of soft magnetic sintered material having electrically insulated grains.

Since the solid material of the first portion constitutes shielding relative to high frequency fields (shielding by induced current), the second portion is preferably located closer to the coil so as to be able to "channel" the high-frequency magnetic field lines in said portion. In addition, in this configuration, the second portion does not constitute any obstacle to the low-frequency magnetic fields generated by the bearing currents, which fields are naturally concentrated towards the first portion constituted by a material that is more permeable. Nevertheless, other positions in the bearing could be envisaged for the second portion.

Thus, with the structure of the invention, it is possible to "separate" the low-frequency magnetic field lines (bearing function) from the high-frequency magnetic field lines (detector function) within a single bearing while naturally retaining only one coil and one amplifier per electromagnet.

In axial abutment devices, it is general practice to use a solid abutment flywheel (rotor 110). Under such circumstances, it is also necessary to provide a magnetic field line pattern in the rotor that is equivalent, i.e. a main first portion that is solid for the low-frequency magnetic field lines (bearing function) and for mechanical strength, and a second portion of smaller permeability and high resistivity that encourages penetration of high-frequency magnetic fields used for position detection (detection function). As shown in FIG. 1, the rotor 110 comprises a first portion 111 of solid material such as iron, and a second portion 112, e.g. made out of a powder of the same type as that used for the portion 124 of the stator.

Figure 2:
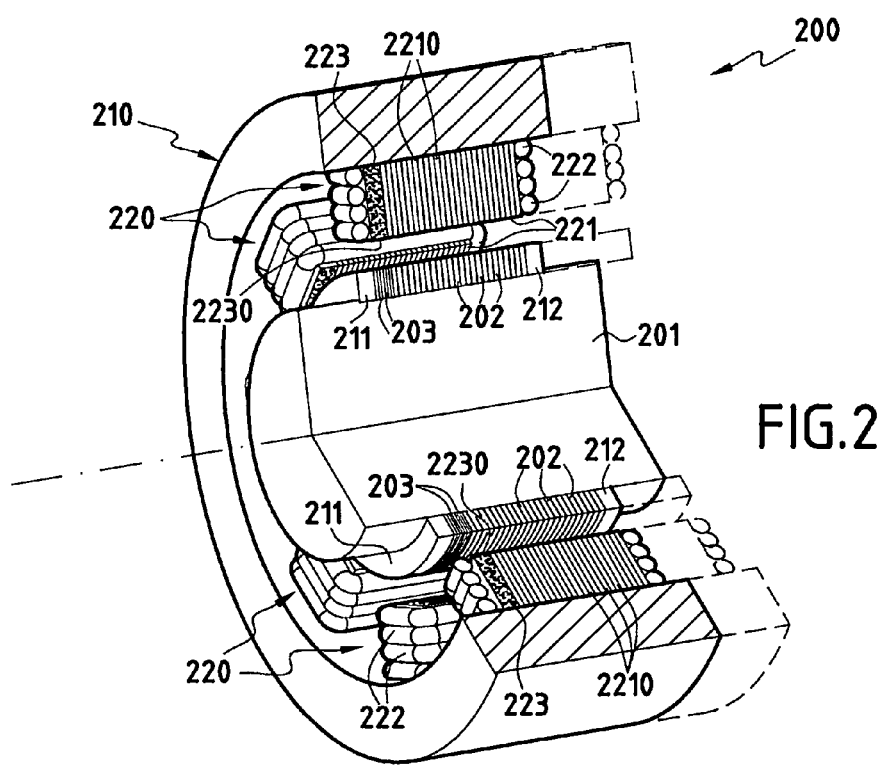
FIG. 2 is an axial half-section view of a radial magnetic bearing structure with autodetection of position in accordance with another embodiment of the present invention.
Figure 3:
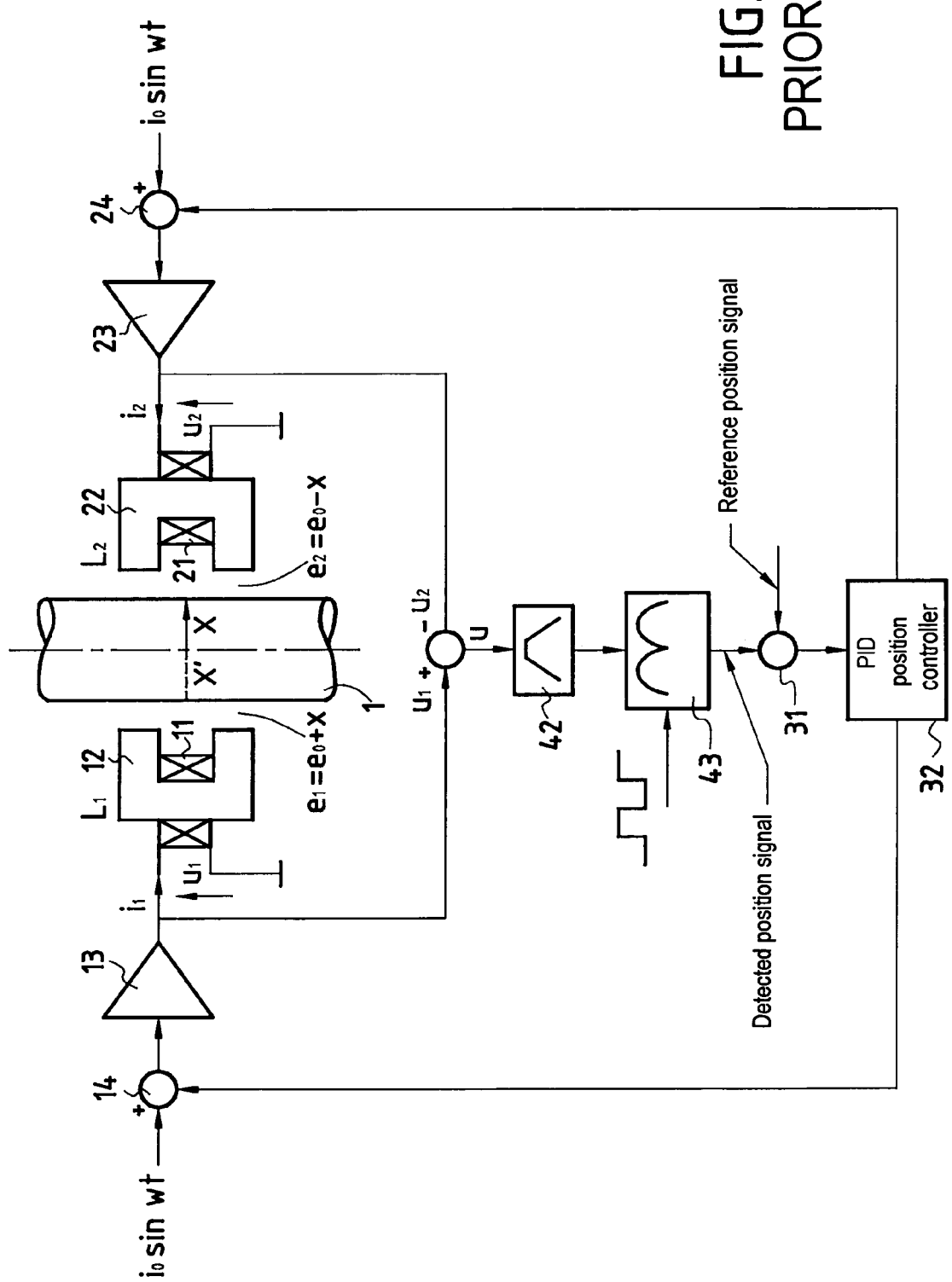
FIG. 3 is a functional diagram of a prior art active magnetic bearing system incorporating a position detection system using bearing electromagnets.

The bearing configuration described above for an axial bearing as used in an abutment device can also be applied to a radial bearing. FIG. 2 shows an embodiment of a radial bearing 200 having a structure in accordance with the present invention. The radial bearing 200 comprises a stator 210 and a rotor 201 that rotate relative to each other. The stator 210 is fitted with electromagnets 220 each comprising a magnetic circuit 221 constituted by a stack of ferromagnetic laminations 2210 surrounded by an excitation coil 222. Each electromagnet is driven is current-driven by a known servo-control system for keeping the rotor 201 in suspension in a predetermined radial position. The radial displacements of the rotor 201 are detected by measuring the voltage at a given frequency across the terminals of each of the coils 222 of the bearing, as explained in detail in U.S. Pat. No. 5,844,339.

The rotor 201 is fitted with a stack of ferromagnetic laminations 202 extending over an axial length that is slightly longer than that of the stack of laminations 2210 of the magnetic circuit 221. The rotor 201 is held by the magnetic fields created by the electromagnets 220 disposed on the stator 210.

Like the axial bearing described above, the magnetic circuit 221 has a second portion 223 made of a ferromagnetic material that presents lower magnetic permeability than the first portion corresponding to the stack of ferromagnetic laminations 2210. The material used for forming this second portion preferably presents a permeability coefficient of about 100, and preferably of a smaller value. Furthermore, this material must also have high electrical resistivity (e.g. 50 Ωm) in order to facilitate the passage of the high frequencies used when injecting the detection signal into the bearing, which frequency is typically about 20 kHz. For this purpose, the second portion 223 may be formed out of a washer 2230 of iron powder presenting resistivity that is high compared with that of solid materials, while still being of small permeability. The stack of ferromagnetic laminations 2210 co-operates with the iron powder washer 2230 to form a sandwich structure that can be held by two rings 211 and 212 of non-magnetic material such as steel, bronze, or aluminum, the two rings being situated on respective sides of the structure.

The rotor 201 may encounter problems of limited strength in the powder parts given the high speeds of rotation imposed on the rotor. Under such circumstances, instead of a ferromagnetic powder, it is possible to use ferromagnetic laminations of small thickness for making the portion that is sensitive to high frequency magnetic fields. Unlike the solid structure of the rotor used for an axial bearing, the rotor 201 is fitted with a stack of ferromagnetic laminations 202 for conveying the magnetic fields created by the electromagnets of the stator 210. The separation between the high and low frequency magnetic fields is already achieved in the stator, so it is possible to be satisfied with using thin laminations for making a magnetic field line pattern that is equivalent to that defined in the stator, i.e. a main first portion for the low frequency field (bearing function) and a second portion of smaller permeability and high resistivity for enhancing penetration of high frequency fields (detection function). As shown in FIG. 2, the rotor may comprise a stack of ferromagnetic laminations 203 each presenting thickness that is smaller than the thickness of the laminations 202 used in the remainder of the stack on the rotor. Thus, by reducing the thickness of the laminations in the rotor stack over an axial length corresponding to that portion of the rotor that faces the portion 223 of the stator, a portion is formed that presents poor permeability (small lamination thickness) and high resistivity (spacing between the laminations). The thickness of the ferromagnetic laminations 202 used for the main portion of the rotor that is to receive the low frequency magnetic fields may be about 0.2 mm, for example. Under such circumstances, and by way of example, for the second portion that is to carry the high frequency magnetic field, it is possible to select laminations 203 having a thickness of half that, i.e. in the example shown, about 0.1 mm.

The principle of "separating" the low and high frequency magnetic paths in the stator and the rotor as described above for the particular embodiments of FIGS. 1 and 2 can be generalized to any type of active magnetic bearing. The portion having low permeability and high resistivity can be standardized in terms of dimensions, or in any event it can be restricted in size regardless of the dimensions of the stator and/or the rotor, which sizes need to be defined as a function of the load-bearing capacity required of the bearing. This aspect of the invention is particularly advantageous for solid parts of dimensions that have a direct influence on the inductance value measured at high frequency (e.g. 20 kHz).

Thus, as shown by discontinuous lines in FIGS. 1 and 2, the dimensions of the stator and rotor portions of the bearing can be made greater without any need to increase the dimensions of the specific portions reserved for passing high frequency fields. When the bearing includes such portions, the high frequency voltage that the bearing amplifier needs to deliver for detection purposes is no longer associated with the size of the bearing, but only with the size of its low permeability and high resistivity portions. Consequently, it suffices to define standard dimensions for the low permeability and high resistivity portions that suffice for guaranteeing well-defined inductance, regardless of the dimensions of the bearing. It is then possible to select frequency and amplitude values for the detection signal, which is not possible with conventional autodetection of position bearings in which the frequency and the amplitude of the detection voltage are determined by the requirements of the bearing (bearing function).

Furthermore, because of two-permeability structure of the bearing of the invention, the coupling between the inductance seen at the detection frequency (e.g. 20 kHz) and the bearing current is greatly decreased since the permeability of the low frequency portion is always greater than the permeability of the high frequency detection portion, even if saturation phenomena appear in the low frequency path. It is then possible to push back the induction limit beyond 1 T and consequently to reduce the size of the bearing.

The invention claimed is:

1. An active magnetic bearing with autodetection of position, the bearing comprising a stator comprising at least first and second opposing electromagnets, said stator disposed about a ferromagnetic body forming a rotor held without contact between said electromagnets, the first and second electromagnets each comprising a magnetic circuit essentially constituted by a first portion comprising a first ferromagnetic material and co-operating with said ferromagnetic body to define an airgap, together with an excitation coil powered from a power amplifier whose input current is servo-controlled as a function of the position of the ferromagnetic body relative to the magnetic circuits of the first and second electromagnets, the position of the ferromagnetic body being measured from the inductance detected between the two electromagnets in response to simultaneous injection into both opposing electromagnets of a sinusoidal current at a frequency that is greater than the closed loop passband of the system, the bearing being characterized in that the magnetic circuit of each electromagnet further includes a second portion comprising a second ferromagnetic material having magnetic permeability that is lower than that of the first ferromagnetic material and electrical resistivity that is higher than that of the first ferromagnetic material so as to encourage the passage of the high frequency magnetic fields that are generated in the bearing, wherein the second portion is located between the first portion and the excitation coil, and wherein said first ferromagnetic material comprises a plurality of ferromagnetic laminations stacked in a direction parallel to an axial length of the rotor.

2. A bearing according to claim 1, characterized in that the second portion is formed by a piece made of powder comprising grains of magnetic material that are electrically insulated from one another.

3. A bearing according to claim 2, characterized in that the powder comprises grains of iron that are electrically insulated from one another.

4. A bearing according to claim 1, characterized in that the ferromagnetic body forming the rotor includes at least one portion of ferromagnetic material having magnetic permeability that is lower and electrical resistivity that is greater than a remainder of said body so as to encourage the passage of high frequency magnetic fields, said portion being disposed substantially in register with each of the second portions formed in the electromagnet.

5. A bearing according to claim 4, characterized in that the at least one low magnetic permeability and high electrical resistivity portion of the ferromagnetic rotor-forming body is formed by a part made of powder comprising grains of magnetic material that are electrically insulated from one another.

6. A bearing according to claim 5, characterized in that the powder comprises grains of iron that are electrically insulated from one another.

7. A bearing according claim 4, characterized in that the ferromagnetic rotor-forming body includes a stack of ferromagnetic laminations, the laminations present in the low permeability and high resistivity portion each having a thickness that is smaller than a thickness of those other laminations in the stack.

8. A bearing according to claim 1, characterized in that each of the second portions presents a magnetic permeability of about 100.

9. A bearing according to claim 1, characterized in that each of the second portions presents an electrical resistivity of about 50 Ωm.

10. A bearing according to claim 1, characterized in that the active magnetic bearing is of the radial type.

11. A bearing according to claim 3, characterized in that:
the ferromagnetic body forming the rotor includes at least one portion of ferromagnetic material having magnetic permeability that is lower and electrical resistivity that is greater than a remainder of said body so as to encourage the passage of high frequency magnetic fields, said at least one portion being disposed substantially in register with each of the second portions formed in the electromagnet;

wherein the low magnetic permeability and high electrical resistivity portion of the rotor-forming body is formed by a part made of powder comprising grains of magnetic material that are electrically insulated from one another; and wherein the powder comprises grains of iron that are electrically insulated from one another.

12. A bearing according to claim 4, characterized in that each of the low magnetic permeability and high electrical resistivity portions presents magnetic permeability of about 100.

13. A bearing according to claim 7, characterized in that:
each of the low magnetic permeability and high electrical resistivity portions presents magnetic permeability of about 100; and each of the low magnetic permeability and high electrical resistivity portions presents electrical resistivity of about 50 Ωm.

14. A bearing according to claim 7, characterized in that:
each of the low magnetic permeability and high electrical resistivity portions presents magnetic permeability of about 100;

each of the low magnetic permeability and high electrical resistivity portions presents electrical resistivity of about 50 Ωm; and the active magnetic bearing is of the radial type.

15. An active magnetic radial bearing, comprising:

a stator; and a rotor configured to rotate relative to the stator, wherein the stator comprises an excitation coil, a first stator portion comprising first ferromagnetic material comprising a plurality of ferromagnetic laminations stacked in a direction parallel to an axial length of the rotor and a second stator portion comprising a second ferromagnetic material, the excitation coil surrounding the first and second stator portions, the second stator portion being located between the first stator portion and the excitation coil, and wherein the second ferromagnetic material of the second stator portion has a magnetic permeability that is lower than a magnetic permeability of the first stator portion and the second ferromagnetic material has an electrical resistivity that is higher than an electrical resistivity of the first stator portion, and wherein the rotor comprises a first rotor portion and a second rotor portion disposed over an axial length of the rotor and substantially in register with, respectively, the first and second stator portions, and wherein the second rotor portion has a magnetic permeability that is lower than a magnetic permeability of the first rotor portion and the second rotor portion has an electrical resistivity that is higher than an electrical resistivity of the first rotor portion.

16. The active magnetic radial bearing of claim 15, wherein:

the first rotor portion comprises a first stack of ferromagnetic laminations arranged parallel to the axial length of the rotor, wherein each lamination in the first stack is of a first thickness; and the second rotor portion comprises a second stack of ferromagnetic laminations arranged parallel to the axial length of the rotor, wherein each of the laminations in the second stack is of a second thickness, wherein the second thickness is smaller than the first thickness.

\* \* \* \* \*